March 27, 1934.  F. R. KAIMER  1,952,923
ELECTRICAL CABLE
Filed Jan. 12, 1932
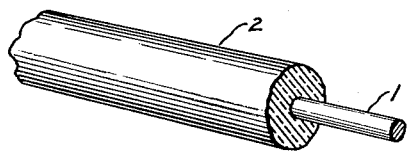
Inventor
Fred R. Kaimer
by Charles E. Jullar
His Attorney.

Patented Mar. 27, 1934

1,952,923

UNITED STATES PATENT OFFICE 1,952,923

ELECTRICAL CABLE

Fred R. Kaimer, York, Pa., assignor to General Electric Company, a corporation of New York Application January 12, 1932, Serial No. 586,134

1 Claim. (Cl. 106—13)

The present invention relates to electrical cables and is more particularly concerned with insulation for cables which is ozone-resistant in character and to a method of producing such insulation.

In a copending application Serial No. 461,304 filed June 16, 1930 and assigned to the assignee of the present invention I have described and claimed a cable construction wherein rubber is employed to impart high dielectric insulation and flexibility to the cable construction and wherein the rubber is protected by a covering or sheath of specially prepared ozone-resistant material to protect the rubber against deterioration due to the oxidizing effects of ozone generated in high voltage circuits. In the said application a cable construction is set forth which is excellent in its ozone resistant qualities and which is very useful in high voltage circuits such as those used for example in display signs. The insulation construction of my copending case is a two part construction.

In accordance with my present invention I provide a novel composition whereby I am enabled to effect a single wall insulation embodying the dielectric properties and flexibility of vulcanized rubber and the ozone-resistant qualities of the outer covering of the construction in my copending application. The result is greater economy and ease of manufacture and a single walled ozone-resistant rubber insulation of increased flexibility. The new construction not only combines both the ozone-resistant properties and high insulation value into a single insulation but the composition is such that it can be extruded over the conductor by the well known tubing method used in rubber insulated conductor manufacture.

A high degree of plasticity and softness represented by under-cure or semi-cure is an asset toward obtaining ozone resistance. While it is possible to employ certain types of rubber compounds, such as reclaim rubber, properly proportioning the ratio of accelerator and vulcanizing agent used, and obtain a semi-cured plastic mass, such insulation does not possess the ozone-resistant qualities obtained with the use of the specially prepared ozone resistant material employed in the copending case referred to above. Furthermore, where the cable insulation must resist a high potential test of 60 KV. and a duration test of 30 KV., as well as ozone, it is necessary to have not only a plastic insulation but one possessing the ozone resistant qualities of the ozone resistant material above referred to.

I have found that by properly proportioning the amount of ozone resistant material used with respect to the amount and kind of rubber used I am enabled to produce a composition wherein, on curing, the vulcanized pitch acts as a retarder of vulcanization, produces a high grade insulation which is relatively soft and plastic in character and at the same time there results an insulation which is durable at high potentials and is resistant to ozone.

In my copending application above referred to the rubber employed as the initial covering for the conductor is a high grade rubber. This is used to impart high dielectric value to the insulation. However this high grade rubber prevents the direct extrusion of the vulcanized pitch covering thereover and necessitates the use of an interbraid. In the present invention the rubber compound employed is distinctly lower in pure rubber content and so proportioned with respect to the vulcanized pitch that an extrudable composition results which is at the same time ozone resistant and of requisite dielectric strength.

In the accompanying drawing which forms a part of the present application the single figure is a perspective view of a portion of a cable embodying the present invention. The numeral 1 indicates a metallic conductor and the numeral 2 indicates the ozone-resistant insulation which is more fully described below.

I have found that in order to carry out my invention successfully I must employ the rubber and the ozone resistant material, which is a specially prepared ozone resistant vulcanized pitch, more fully described below, in the following range:

Crude rubber, approximately 5–10% by weight
Reclaim rubber (approximately 25% rubber), approximately 15–25% by weight
Ozone-resistant vulcanized pitch, approximately 25–45% by weight
Filler (includes softeners, plasticizers, vulcanizing agent, accelerator, etc.), balance Filler is balanced in accordance with rubber compounding practice using not more than ¼% accelerator.

The crude rubber can be replaced by an equivalent amount of reclaim.

The special vulcanized pitch, which is the active ozone-resistant ingredient, is prepared as set forth in my copending application above referred to. This procedure comprises first, the mixing of a vegetable pitch, such as, for example, palm oil pitch, cottonseed pitch and the like; a semi-drying oil such as rapeseed oil, castor oil and the like; and a vulcanizing agent such as sulphur together with magnesia or an accelerator having similar properties, heating gradually to form a viscous liquid mass, the final temperature reaching the neighborhood of 300–350° F. While the proportions of ingredients used may vary, I prefer to use a mixture of approximately the following composition:

| | Parts |
|---|---|
| Palm oil pitch | 50 |
| Rapeseed oil | 50 |
| Sulphur | 5 |

During the heating period a combination with the sulphur takes place which is perhaps similar to rubber vulcanization. To control the melting point and penetration of the resultant product the heating period may vary from 3 to 7 hours. I prefer to use a product which is formed by heating the above mixture over a period of about 6 hours at 300° F. After heating, the mass is allowed to cool and set to a rubber-like material.

The ozone-resistant insulation is prepared as follows:

The rubber, crude and reclaim, is first ground in a suitable machine for example a Banbury mixer for a few minutes, say about 3 minutes after which the vulcanized pitch is added and the mixing continued for another short period say about seven minutes. All fillers except the vulcanizing agent (e. g. sulphur) are then added and the mixing continued for another period of about 7 minutes. The mass is then mixed on a rubber mill for about 5 minutes after which it is strained. The sulphur is then added and the stock as prepared above with the sulphur is thoroughly mixed on a mill.

The stock is extruded in well known manner on conductors by means of standard tubing practice. The insulated conductor is then vulcanized for a period of 1½ hours employing a 1 hour rise to 30 pounds steam pressure (274° F.) and a ½ hour cure at this steam pressure.

The cured insulation resembles a semi-vulcanized rubber compound in physical properties. It is plastic, flexible and ductile. The vulcanized pitch appears to retard the cure of the mass sufficiently to insure these physical properties. When used within the range given above the vulcanized pitch and rubber combination form an extrudable composition. On curing, the vulcanized pitch retards the cure sufficiently to give the insulation the physical properties aforementioned. In addition, the vulcanized pitch imparts excellent ozone resistant qualities to the cable insulation.

What I claim as new and desire to secure by Letters Patent of the United States is:

An extrudable ozone-resistant insulation adapted for high tension service containing in addition to fillers the following ingredients, crude rubber about 5–10% by weight, reclaim rubber (about 25% rubber content) about 15–25% by weight, and ozone-resistant vulcanized pitch about 25–45% by weight, said ozone-resistant vulcanized pitch comprising the products of vulcanization of palm oil pitch, rapeseed oil and sulphur.

FRED R. KAIMER.